May 12, 1925.  1,537,701
G. E. R. ROTHENBUCHER
ENGINE VALVE
Filed Aug. 11, 1922
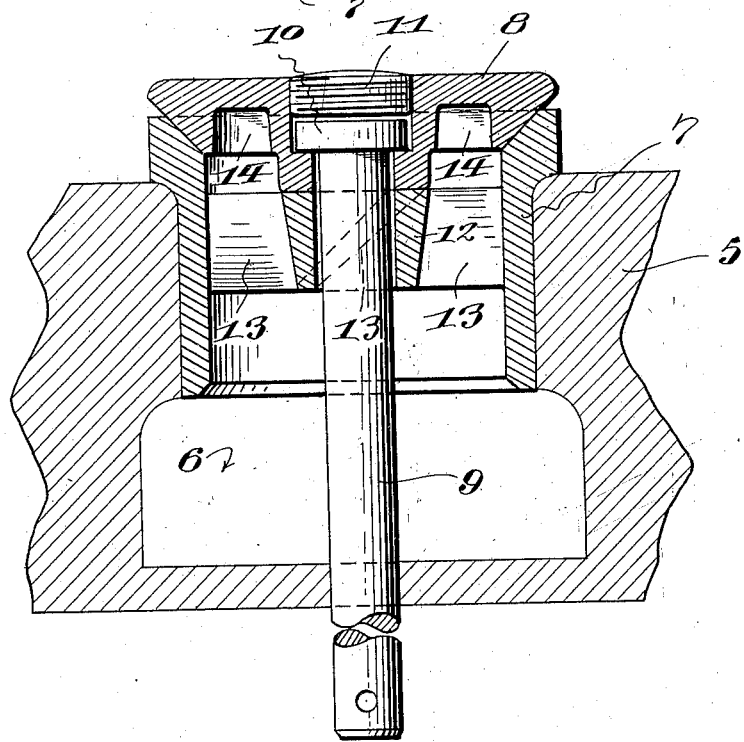
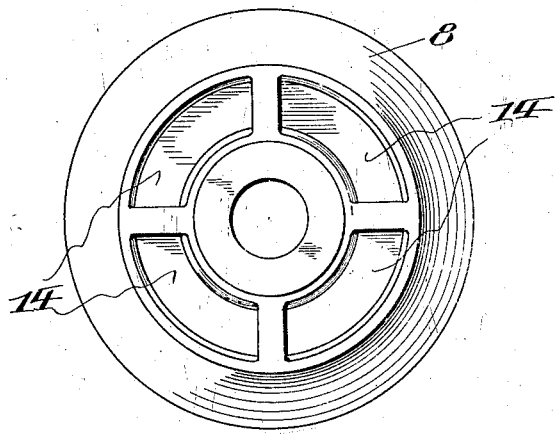
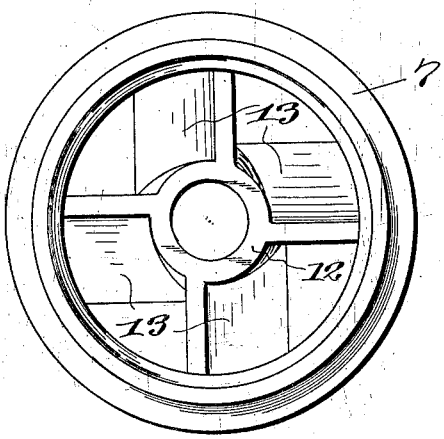
Inventor:
George E.R. Rothenbucher.
By *Miller B. Stevens & Co.*
Attorneys.

Patented May 12, 1925.

1,537,701

UNITED STATES PATENT OFFICE.

GEORGE E. R. ROTHENBUCHER, OF CHICAGO, ILLINOIS.

ENGINE VALVE.

Application filed August 11, 1922. Serial No. 581,171.

*To all whom it may concern:*

Be it known that I, GEORGE E. R. ROTHENBUCHER, a citizen of the United States, residing at Chicago, in the county of Cook and State of Illinois, have invented new and useful Improvements in Engine Valves, of which the following is a specification.

This invention relates to valves for internal-combustion engines, and more particularly to valves of the poppet type. As is well known, such valves require frequent grinding to obtain a proper seating, and the invention therefore has for its object to provide a valve which is practically self-grinding, it being so constructed that it is given a slight rotary movement as it rises off its seat, this action being produced by the impact of the gases or other fluids against certain deflecting wings and the like, as will be described in detail hereinafter.

In order that the invention may be better understood, reference is had to the accompanying drawing, wherein:

Figure 1 is a vertical central sectional view of the device, Fig. 2 is a bottom plan view of the valve head detached from its companion parts, and Fig. 3 is a similar view of the valve seat.

Referring specifically to the drawing, 5 denotes a fragment of the cylinder block of an internal combustion engine, and at 6 is shown one of the ports thereof. This port is fitted with an annular member 7 which serves as a seat and guide for the valve which controls the admission of the fuel charges. The valve is of the poppet type, and it consists of a head 8 and a stem 9.

The valve head 8 is rotatably mounted on the stem 9 so that it is free to turn. The head 8 has a recess to loosely seat an enlargement 10 of the upper end of the valve stem, and this enlargement does not completely fill the recess, so that there is left sufficient space to receive a screw plug 11 which is employed for the purpose of preventing separation of the valve head and the stem. The plug 11 is located above the enlargement 10 of the valve stems, and beneath the enlargement the recess in the valve head is reduced to the diameter of the valve stem. There is sufficient clearance between the hereinbefore described parts to prevent binding as expansion takes place from the heat to which the valve is subjected when in operation.

The seat member 7 has a central hub 12 through which the valve stem 9 passes, said hub therefore serving as a guide for the valve. From the hub radiate deflecting wings 13, the same extending across the space between the hub and the inner surface of the seat member. These wings are set obliquely to the direction of the gas or other fluid flow through the seat member, whereby such fluid is deflected laterally for a purpose to be presently described.

The under side of the valve head 8, or that side which faces the seat member 7 is formed with a series of pockets 14 which register with the space between the hub 12 and the inner surface of the hub member.

In operation, the gas or other fluid passing through the seat member 7 is deflected laterally into the pockets 14 by the wings 13, with the result that the valve head 8 is given a rotary movement as it rises off its seat. This rotary motion of the valve head prevents it from seating in the same place, so that the seating surface of the valve head, as well as the surface of the seat engaged thereby, will be kept clean and smooth, and a perfect seating at all times is assured. The lateral deflection of the fluid into the pockets 14 assures a rotary movement of the valve head.

I claim:

A valve structure for use on internal combustion engines comprising a substantially tubular member having a hub and a plurality of radial obliquely arranged wings connecting the hub to the tubular member, a valve having a head provided with a plurality of separate pockets in the under side thereof and adapted to receive the fluid which passes between the obliquely arranged wings whereby the fluid imparts a turning movement to the valve head, said valve head being provided with a stem movable through said hub.

In testimony whereof I affix my signature.

GEORGE E. R. ROTHENBUCHER.